(12) United States Patent
Sayama

(10) Patent No.: US 8,052,194 B2
(45) Date of Patent: Nov. 8, 2011

(54) STOWABLE VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 12/682,050

(22) PCT Filed: Oct. 9, 2008

(86) PCT No.: PCT/JP2008/068385
§ 371 (c)(1),
(2), (4) Date: Apr. 8, 2010

(87) PCT Pub. No.: WO2009/048107
PCT Pub. Date: Apr. 16, 2009

(65) Prior Publication Data
US 2010/0207420 A1  Aug. 19, 2010

(30) Foreign Application Priority Data

Oct. 9, 2007  (JP) ................................. 2007-263226

(51) Int. Cl.
*B60N 2/30* (2006.01)
*A47C 9/06* (2006.01)

(52) U.S. Cl. ................... 296/65.09; 297/15; 297/378.12; 297/335

(58) Field of Classification Search ............... 296/65.09, 296/65.05; 297/15, 378.1, 378.12, 331, 335, 297/344.1, 344.25

See application file for complete search history.

(56) References Cited

U.S. PATENT DOCUMENTS

| 6,231,101 | B1 | 5/2001 | Kamida et al. |
| 6,837,530 | B2 * | 1/2005 | Rudberg et al. ............ 296/65.09 |
| 6,910,739 | B2 * | 6/2005 | Grable et al. ............ 297/378.12 |
| 7,152,922 | B2 * | 12/2006 | Garland ................... 297/362.11 |
| 7,273,243 | B2 * | 9/2007 | Prugarewicz ............ 296/65.09 |
| 2005/0248302 | A1 | 11/2005 | Garland |
| 2007/0046074 | A1 | 3/2007 | Satta et al. |

FOREIGN PATENT DOCUMENTS

| DE | 10 2005 053 814 B3 | 6/2007 |
| EP | 1 568 536 A2 | 8/2005 |
| JP | 3299179 B2 | 7/2002 |
| JP | 2005-225376 A | 8/2005 |
| JP | 2005-239050 A | 9/2005 |
| JP | 2006-082698 A | 3/2006 |
| JP | 2006-264454 A | 10/2006 |

* cited by examiner

*Primary Examiner* — Dennis Pedder
(74) *Attorney, Agent, or Firm* — Drinker Biddle & Reath LLP

(57) ABSTRACT

There is provided a stowable vehicle seat that can be stowed and restored with improved operability. The stowable vehicle seat has a seat support part for supporting a seat cushion so that the seat cushion is rotatable in the front and rear direction, a seat back having a reclining mechanism that folds over the seat cushion, a stowage recess provided on the vehicle body floor side, a front leg provided on the front side of the seat cushion, a leg locking element that engages and disengages the front leg with and from the vehicle body floor side, a link mechanism connected to the reclining mechanism and the leg locking element, and a strap that operates the reclining mechanism and the leg locking element via the link mechanism.

4 Claims, 13 Drawing Sheets

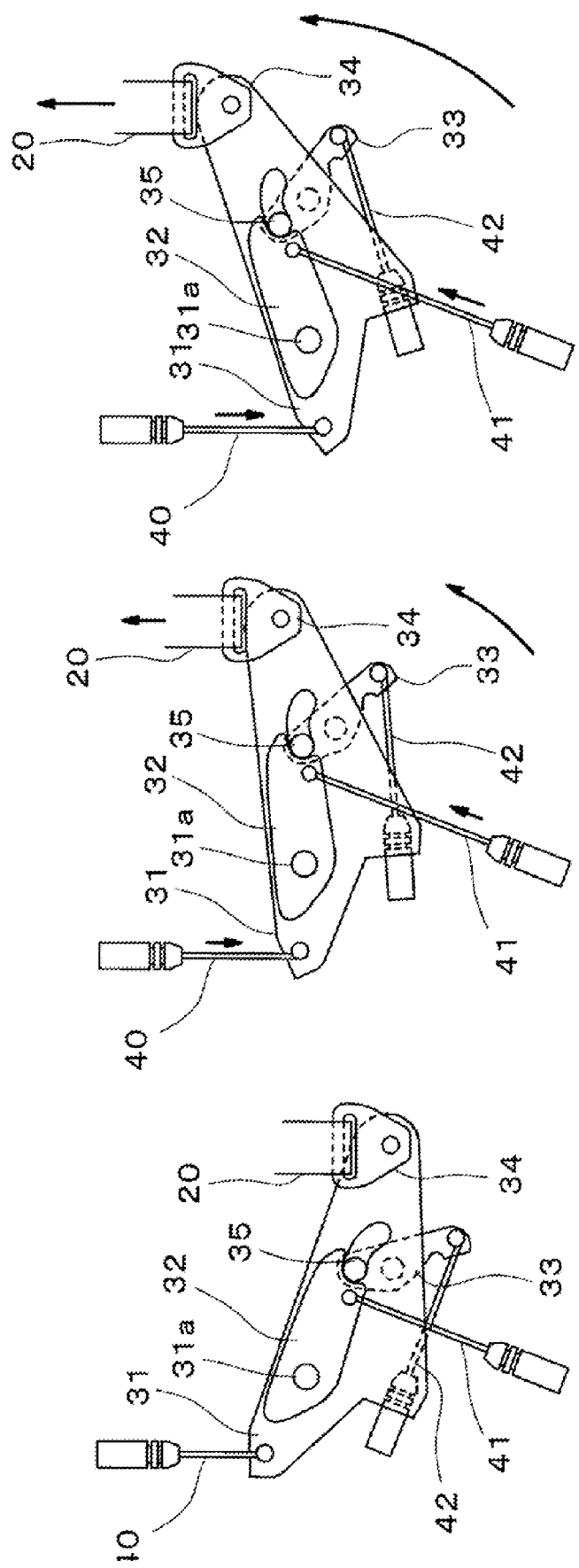

FIG. 12A
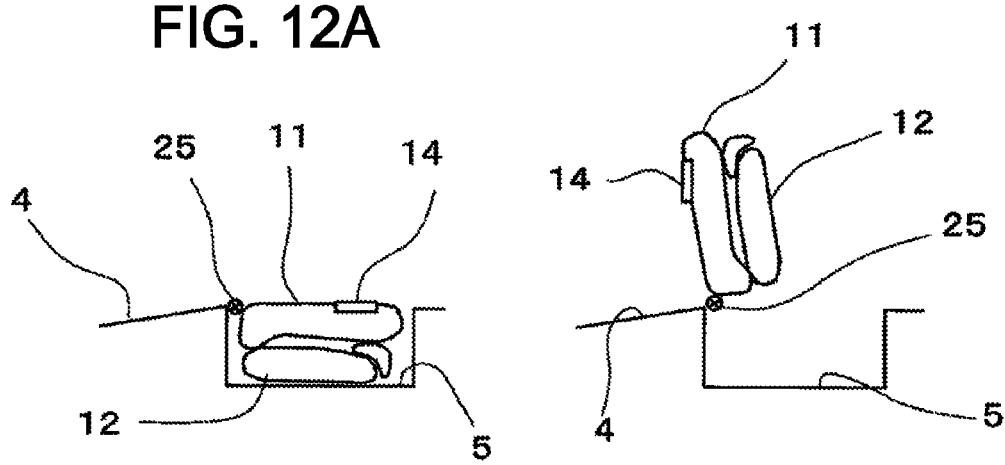
FIG. 12B
FIG. 12C
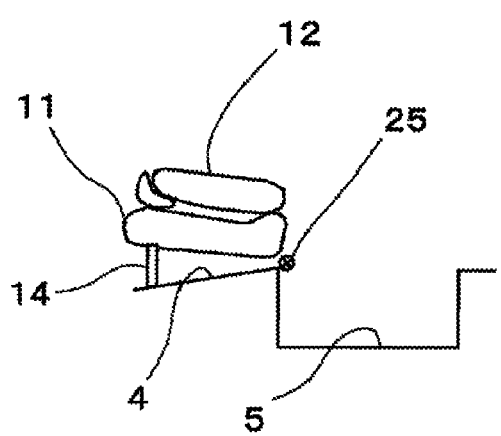
FIG. 12D
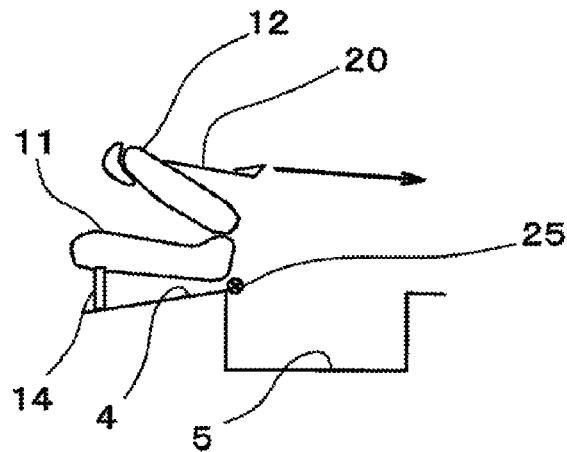
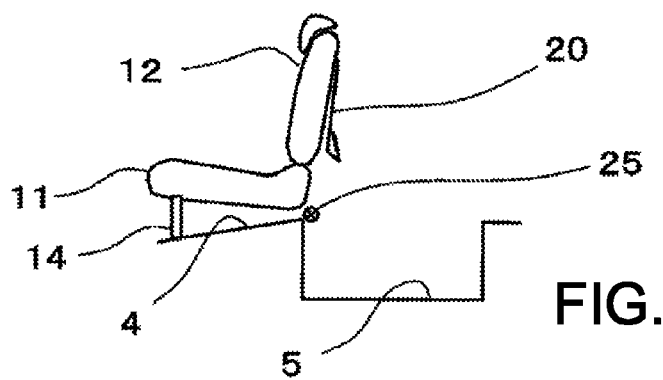
FIG. 12E

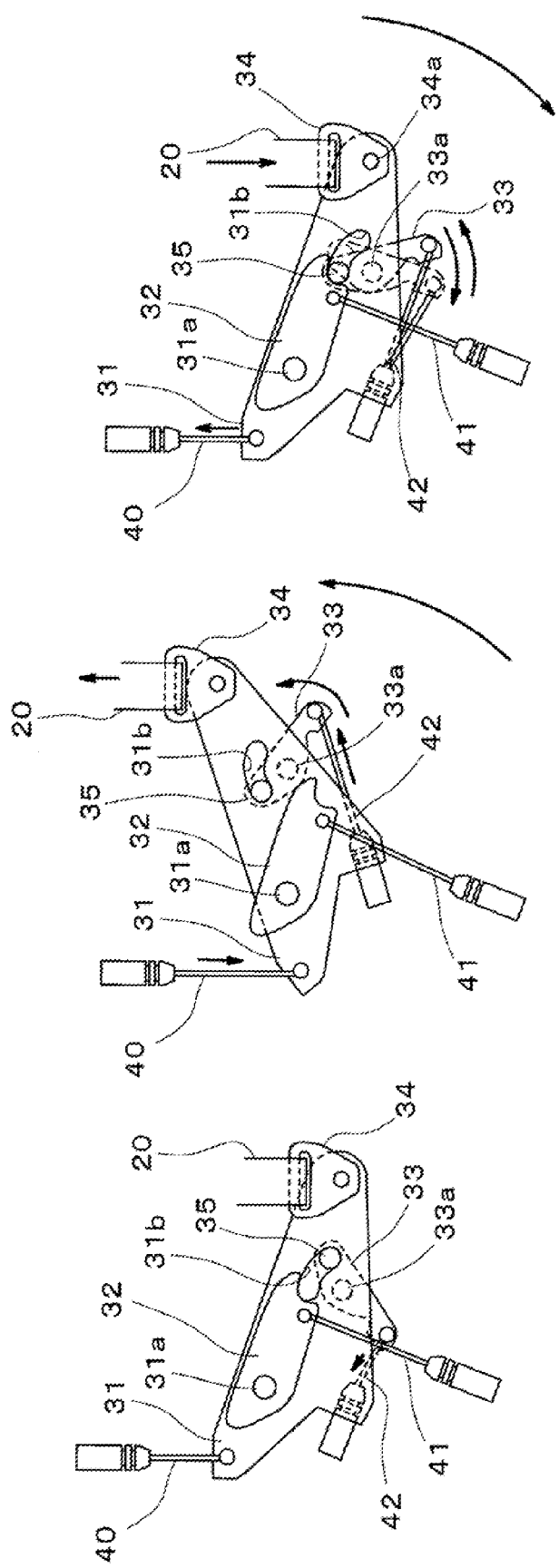

STOWABLE VEHICLE SEAT

CROSS-REFERENCE TO RELATED APPLICATIONS

This application is the U.S. national phase of the International Patent Application No. PCT/JP2008/068385 filed Oct. 9, 2008, which claims the benefit of Japanese Patent Application No. 2007-263226 filed Oct. 9, 2007, the entire content of which is incorporated herein by reference.

BACKGROUND

Various embodiments of the present invention relate to a stowable vehicle seat and, more particularly, to a stowable vehicle seat having improved operability.

Conventionally, there has been known a stowable vehicle seat in which—in the state in which the rear end part of a seat cushion constituting a vehicle seat is supported to be rotatable in the front and rear direction on the front side of a stowage recess (storage recess) in vehicle body floor, and a seat back is folded over the seat cushion—the vehicle seat can be rotated to the rear and stowed in the stowage recess.

For example, as disclosed in Japanese Unexamined Patent Application Publication No. 2006-82698 ("the '698 Publication"), rotating shafts are provided in both right and left side edge parts in the front part of the stowage recess and brackets provided in right and left parts of the rear end part of the seat cushion, and the brackets are disposed to be rotatable in the front and rear direction with respect to the rotating shafts, whereby the seat can be stowed in the stowage recess by supporting the rear end part of the seat cushion to be rotatable in the front and rear direction.

In the technique described in the '698 Publication, the operating element for reclining lock and striker lock operated when the stowable vehicle seat is stowed and restored are separated for each mechanism, and also a lever is used as the operating element for striker lock. Therefore, this technique has a disadvantage that the operation load is high, and the operation is difficult to perform.

SUMMARY

Various embodiments of the present invention have been made to solve the above problems, and accordingly an object thereof is to provide a stowable vehicle seat in which the operability at the time of stowage and restoration is improved.

Also, another object thereof is to provide a stowable vehicle seat in which the operation load is reduced while the cost and weight are reduced.

To achieve the above object, the stowable vehicle seat according to an embodiment includes first seat supporting elements for rotatably supporting an end part side of a seat cushion; a seat back foldable over the seat cushion and having a reclining assembly; a stowage area provided on a vehicle body floor side; second seat supporting elements provided on an other end part side of the seat cushion; an engaging and disengaging assembly that engages and disengages the second seat supporting elements with and from the vehicle body floor side; a link mechanism connected to the reclining assembly and the engaging and disengaging assembly; and an operating element that operates the reclining assembly and the engaging and disengaging assembly via the link mechanism.

Thus, the configuration is made such that the reclining assembly that folds the seat, which is rotatably supported and can be stowed in the stowage area, over the seat cushion and the engaging and disengaging assembly that engages and disengages the lower part of the seat cushion with and from the vehicle body floor side are connected to each other to be operated by the operating element via the link mechanism. Therefore, the operation for releasing the locked state of the reclining assembly and the engaging and disengaging assembly for the leg performed by the operation of the operating element can be performed by one operation, so that high operability can be assured when the seat stowing operation is performed.

The configuration is preferably such that the reclining assembly includes a reclining mechanism for making the seat back foldable over the seat cushion; and a detecting element for detecting the folded state of the seat back, and the link mechanism includes a first link member that is supported rotatably, connected to the operating element and the reclining mechanism, and rotated by the pulling of the operating element; a second link member that is supported rotatably, and connected to the engaging and disengaging assembly; and a third link member that is supported rotatably, and connected to the detecting element, the third link member having a locking part for locking the second link member to the first link member to be engageable and disengageable, and turning in a state in which the folding of the seat back is detected by the detecting element to enable the locking of the locking part to be released.

Thus, the reclining assembly includes the reclining mechanism for making the seat back foldable over the seat cushion; and the detecting element for detecting the folded state of the seat back, the link mechanism includes the first link member that is connected to the operating element and the reclining mechanism, and rotated by the pulling of the operating element; the rotatable second link member connected to the engaging and disengaging assembly; and the rotatable third link member connected to the detecting element, and the third link member has the locking part for locking the second link member to the first link member to be engageable and disengageable, and rotates in the state in which the folding of the seat back is detected by the detecting element to enable the locking of the locking part to be released. Therefore, at the time of seat stowing operation, the operation for releasing the locked state of the reclining assembly and the engaging and disengaging assembly for the leg can be performed by one operation, and also at the time of seat restoring operation, the seat cushion can be raised with respect to the seat cushion by one operation only without releasing the locking of the engaging and disengaging assembly for the leg from the seat cushion folding state, so that high operability can be assured when the seat stowing and restoring operation is performed.

It is preferable that the second link member is pivotally supported to be coaxial with the first link member, and the third link member be rotatably supported on the first link member.

Thus, the second link member is rotatably supported on the first link member, and the third link member is rotatably supported on the first link member. Therefore, the number of parts can be reduced, which contributes to the reduction in cost and weight.

It is further preferable that the seat cushion be pivotally supported to be rotatable in the front and rear direction.

It is also preferable that the operating element be a single element, and that the single element be configured by using a strap.

Thus, by using the strap serving as the single operating element for the stowing and restoring operation of the seat rotatable in the front and rear direction, at the time of seat stowing operation, the seat can be stowed by performing the strap pulling operation in the seat rotating direction, and at the time of seat restoring operation, the seat back can be raised with respect to the seat cushion by performing the strap pulling operation in the seat back rotating direction. Therefore, the strap operating direction and the seat rotating direction can be caused to coincide with each other, so that the operation load can be reduced, which contributes to the improvement in seat operability.

According to the stowable vehicle seat in accordance with various embodiments of the present invention, the operating element having been divided into plural numbers conventionally can be integrated into one operating element, and the operating element operated at the time of seat stowage and restoration can be made one. Therefore, the operability can be improved, and also the number of parts can be reduced, so that the cost and weight can be reduced. That is to say, the stowage state can be formed from the seat set state merely by operating the single operating element, and further at the time of seat restoring operation as well, the seat back can be raised with respect to the seat cushion merely by operating the single operating element, so that high operability can be assured. Also, since the operating element is integrated into one, the number of parts can be reduced, and therefore the cost and weight can be reduced.

Furthermore, the lever having been used as the conventional operating element is replaced with the pulling operation of the strap via the link mechanism. Thereby, the lever operation performed by the movement of the hand fingers can be changed to the pulling operation of the strap using the arm. Therefore, the operation stroke can be made long, and the operation load can be reduced.

BRIEF DESCRIPTION OF THE DRAWINGS

Embodiments of the invention are illustrated in the following drawings and described in more detail below.

FIGS. 11A-C are explanatory side views for explaining operation at the time of stowing operation of a link mechanism in accordance with one embodiment of the present invention;

FIGS. 12A-E are explanatory side views showing an operation procedure at the time of restoring operation of a stowable vehicle seat in accordance with one embodiment of the present invention; and FIGS. 13A-C are explanatory side views for explaining operation at the time of restoring operation of a link mechanism in accordance with one embodiment of the present invention.

DETAILED DESCRIPTION OF THE EMBODIMENTS

One embodiment of the present invention will now be described with reference to the accompanying drawings. Needless to say, the members, arrangements, and the like described below do not restrict the present invention, and can be modified and changed variously in light of the teachings of the present invention.

FIGS. 1 to 13 show one embodiment of the present invention. First, the configuration of a seat S, S1 in accordance with this embodiment is explained with reference to FIGS. 1 to 4.

A vehicle equipped with the seat S of this embodiment has three-row seats arranged in the front and rear direction, and the seat of the third row is configured to be stowable. The seat S in accordance with this embodiment relates to the third-row seat. At the rear of the seat S, a stowage recess 5 serving as a stowage space for stowing the seat S is provided in a vehicle body floor 4. On this vehicle, a floor carpet (not shown) is laid throughout almost the entire surface of the vehicle floor 4.

The seat S has three seats in the right and left direction, and comprises a right seat S1 for two persons, which is located on the right-hand side with respect to the vehicle travel direction, and a left seat S2 for one person.

In the description below, the right-hand side and the left-hand side showing the direction are referred to with respect to the vehicle travel direction.

Also, since the stowage mechanisms and operating methods of the right seat S1 and the left seat S2 are the same, in the explanation below, explanation is given by taking the right seat S1 as the seat S.

Figure 1:
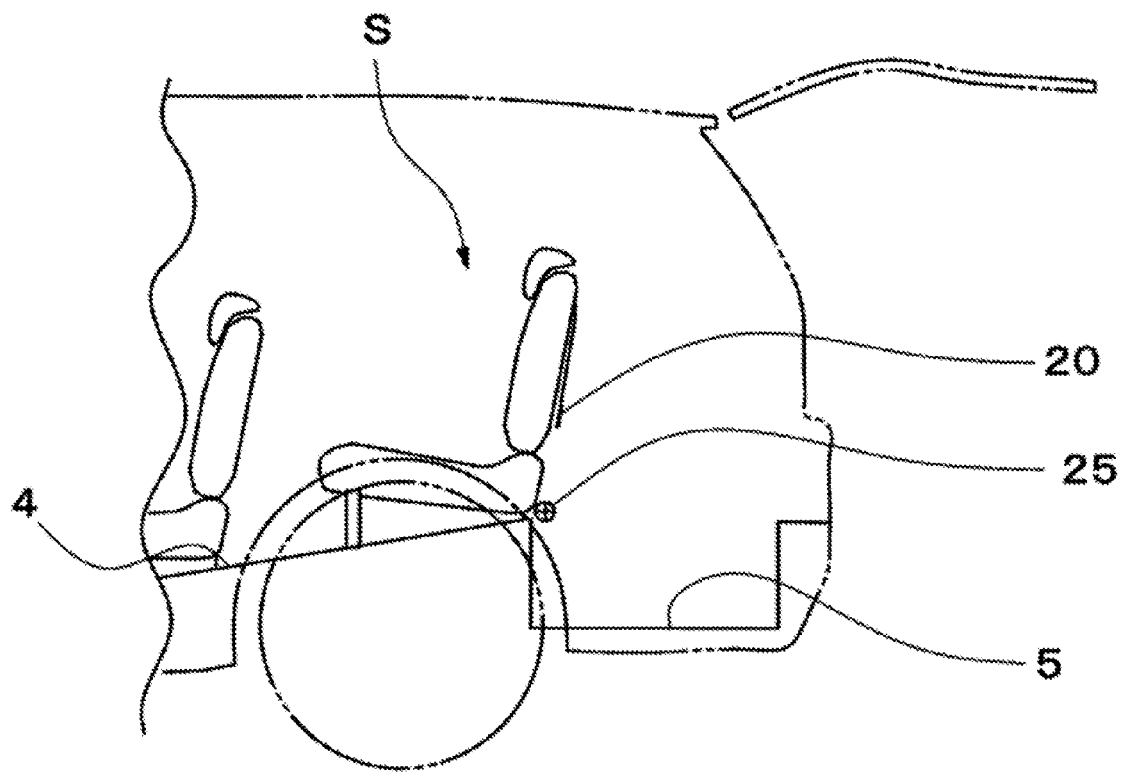
FIG. 1 is a schematic side view of a vehicle rear part equipped with a stowable vehicle seat in accordance with an embodiment of the present invention.
Figure 2:
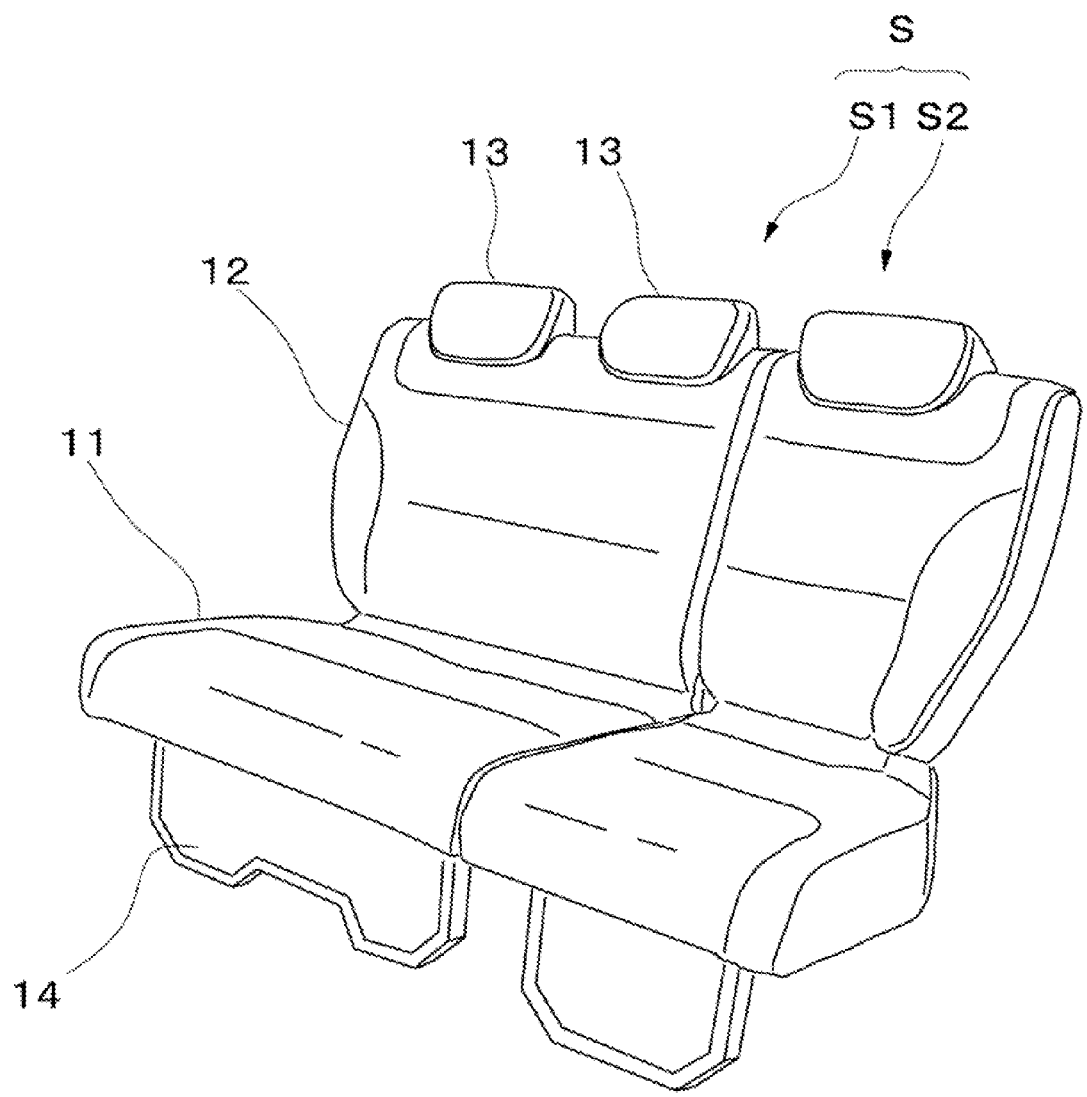
FIG. 2 is a front perspective view of a stowable vehicle seat in accordance with one embodiment of the present invention.
Figure 3:
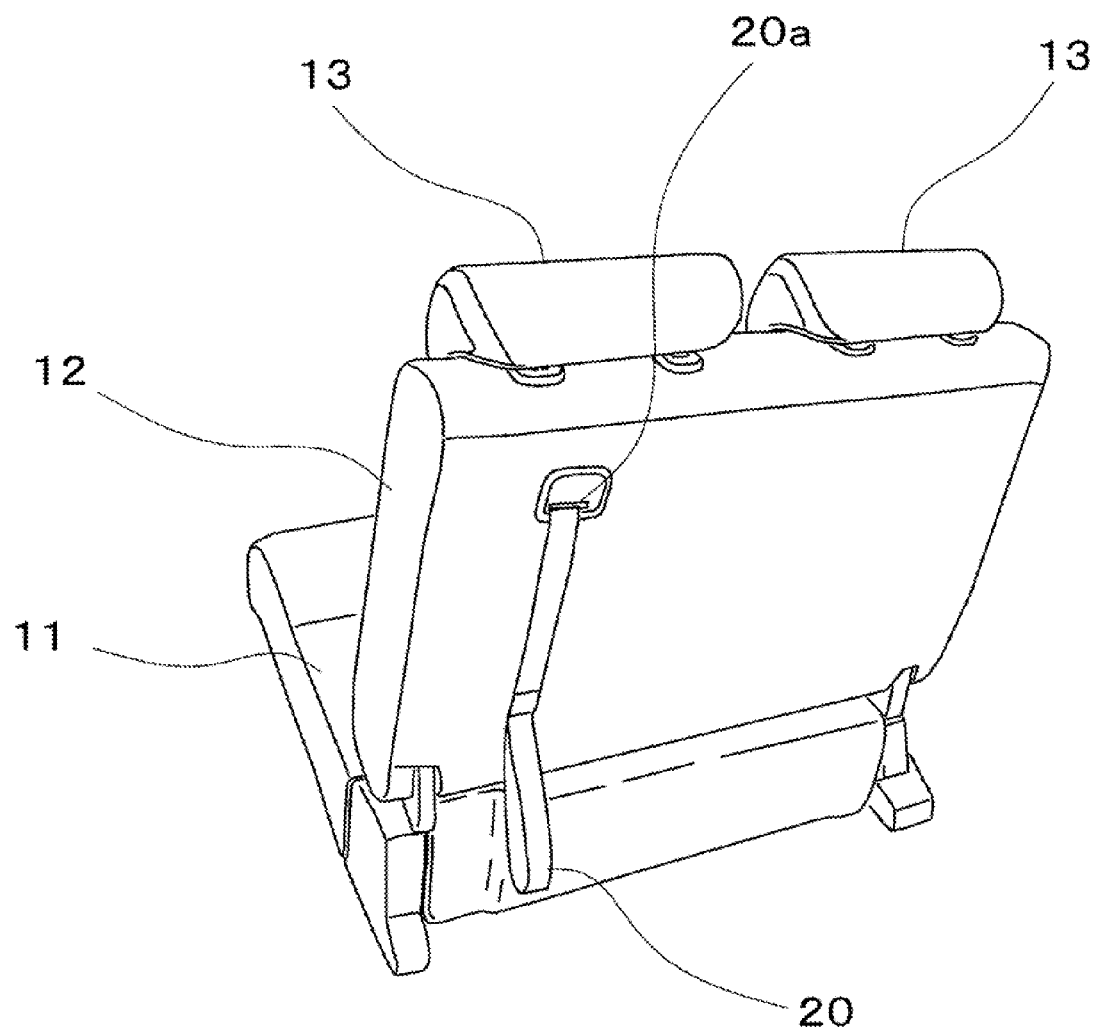
FIG. 3 is a rear perspective view of a stowable vehicle seat in accordance with one embodiment of the present invention.

The seat S is made up of a seat cushion 11, a seat back 12, headrests 13,13, and a front leg 14. Also, as shown in FIG. 3, from the back side of the seat back 12, a strap 20, serving as a single operating element for performing the stowing/restoring operation of the seat S, is extended from the back surface side of the seat S to the outside.

The strap 20 is an operating element operated at the time of stowing/restoring operation of the seat S, and is configured so that a flexible wide belt having a length of about 1 m is extended from a strap outlet part 20a to the other side to facilitate operation performed by a passenger. The stowing/restoring operation of the seat S can be performed by the pulling operation of the strap 20, so that the operation load can be reduced as compared with the operation using a lever. In the state in which the stowing/restoring operation of the seat S is not performed, a part of the strap 20 is hooked to a planar fastener on the back surface of the seat back. In this embodiment, the strap 20 serving as the operating element is configured to be of a belt form. However, the strap 20 may be formed in a string form or a pulling lever form.

Figure 4:
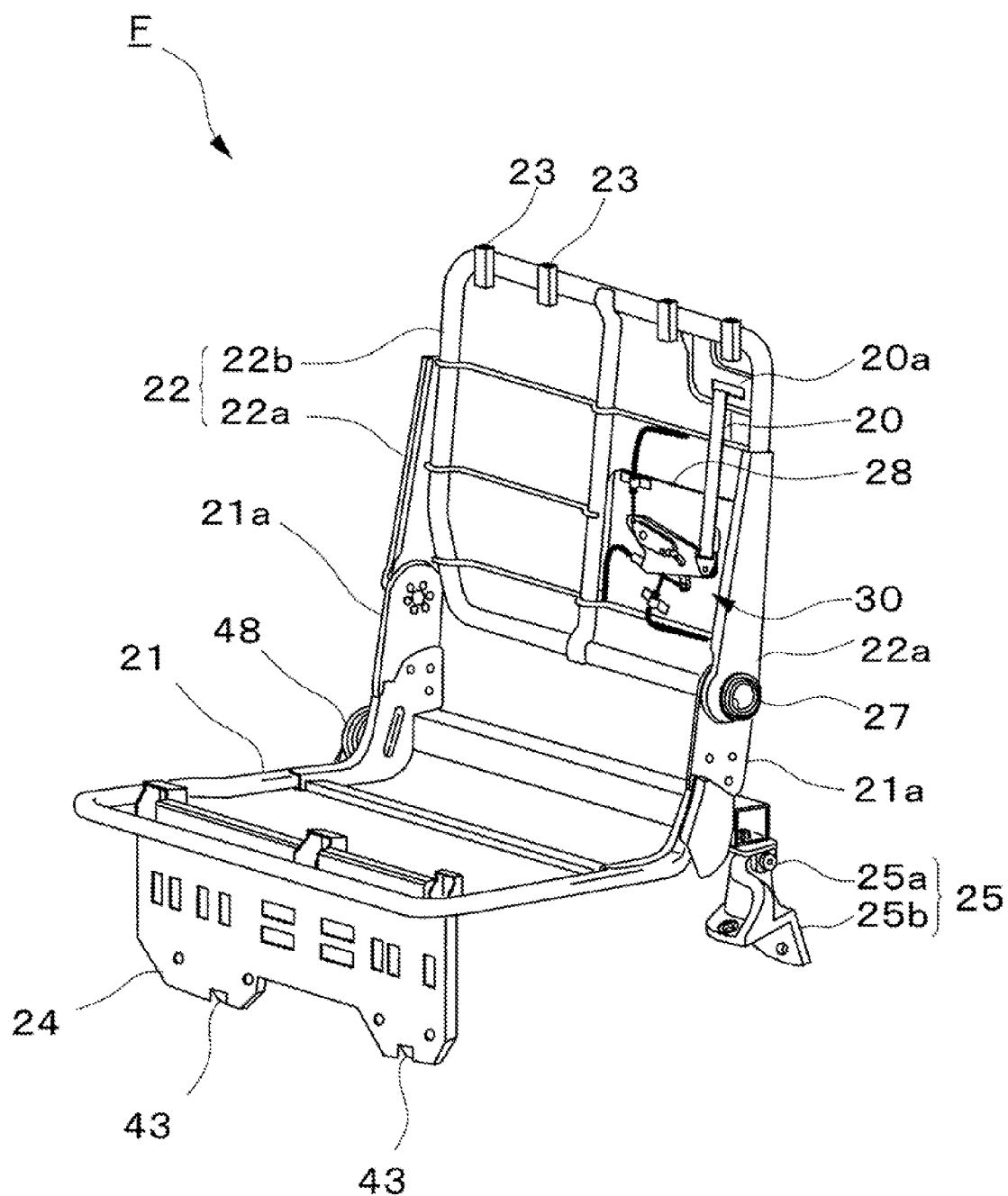
FIG. 4 is a schematic perspective view of a seat frame in accordance with one embodiment of the present invention.
Figure 5:
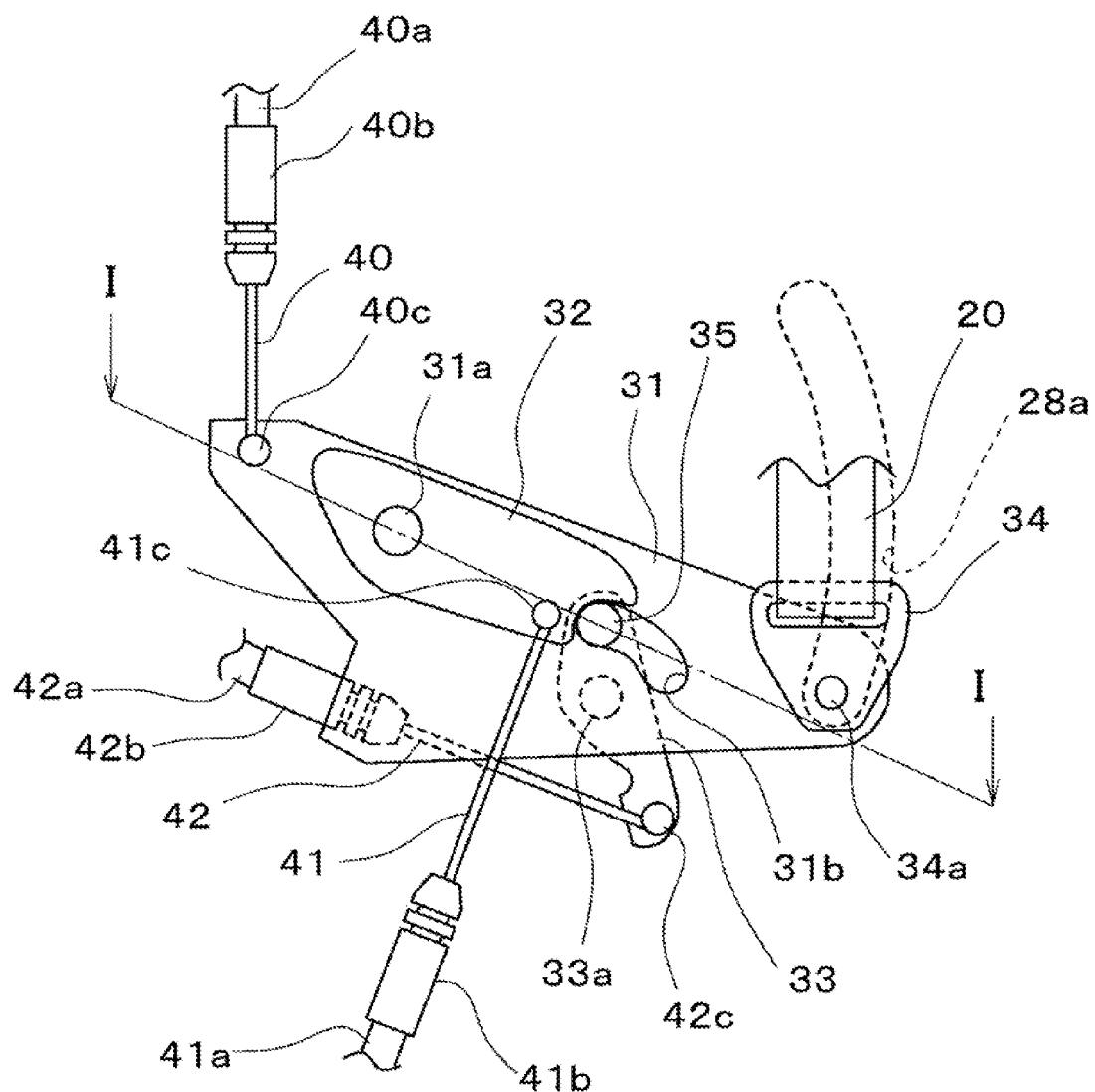
FIG. 5 is an enlarged explanatory side view of a link mechanism in accordance with one embodiment of the present invention.
Figure 6:
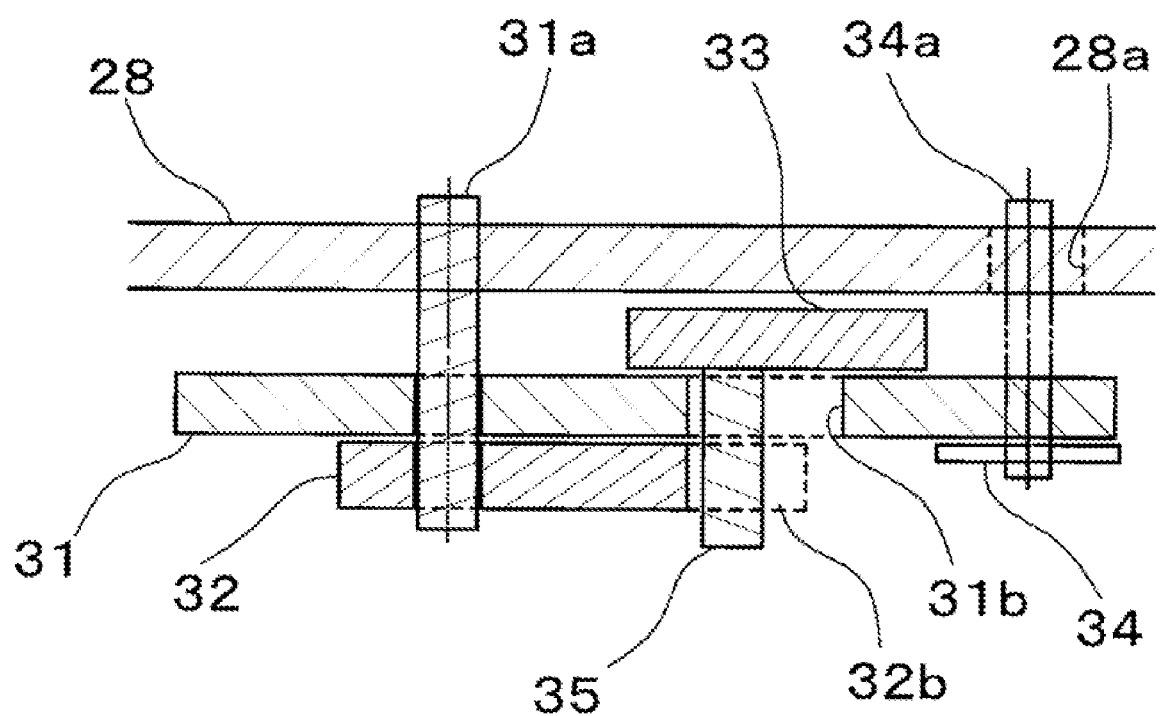
FIG. 6 is a sectional explanatory top view of a link mechanism in accordance with one embodiment of the present invention, the view being taken along the line I-I of FIG. 5.
Figure 7:
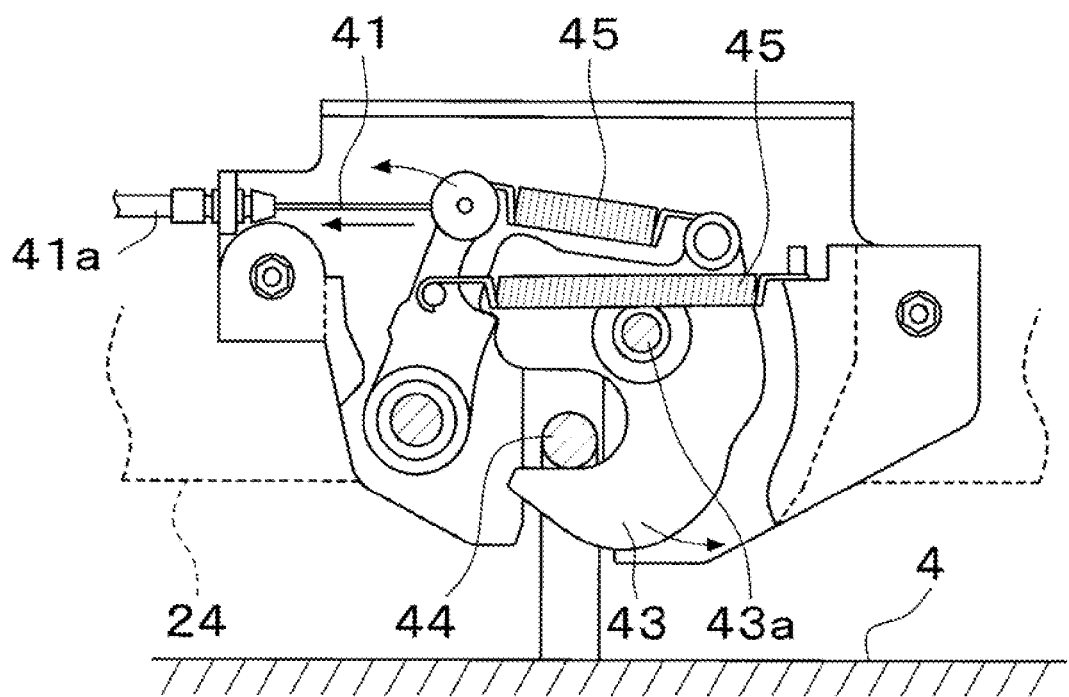
FIG. 7 is a schematic explanatory side view of a locking part of a front leg in accordance with one embodiment of the present invention.

A seat frame F of the seat S shown in FIG. 4 includes a seat cushion frame 21 constituting the seat cushion 11, a seat back frame 22 constituting the seat back 12, and a front leg frame 24. Also, in the upper part of the seat back frame 22, pillars for headrest frames (not shown) are disposed via pillar support parts 23.

The seat cushion frame 21 is used to constitute the seat cushion 11 that is covered by a cushion pad, a cover, or the like (not shown) and supports the passenger from the lower side. The front side of the seat cushion frame 21 is supported on the vehicle body floor 4 side by the front leg frame 24. The rear end part side of the seat cushion frame 21 is supported on a pair of right and left seat support parts 25 serving as first seat supporting elements rotatable in the front and rear direction with respect to rotating shaft brackets 25b fixed to the vehicle body floor 4 side via a rotating shaft 25a. To the seat support part 25, a spiral spring 48 is mounted to urge the seat cushion 11 to the forward rotating direction and to buffer the shock at the stowage time.

Also, in the rear end part of the seat cushion frame 21, back frame support parts 21a, 21a are provided.

The seat back frame 22 is used to constitute the seat back 12 that is covered by a cushion pad or the like (not shown) and supports the passenger's back from the rear, and in this embodiment, comprises a substantially rectangular frame body. More specifically, the seat back frame 22 is formed by two side frames 22a, 22a, which are disposed to be separate in the right and left direction and extend in the up and down direction, and a central frame 22b, which is the substantially rectangular frame body held between the side frames 22a, 22a.

The lower end part side of each of the side frames 22a, 22a is connected to the back frame support parts 21a, 21a via a reclining mechanism 27 serving to recline the seat.

On the inside of the central frame 22b, which is the frame body, a substantially plate-shaped back plate 28 is disposed along the plane for supporting the passenger's back, and on the back plate 28, a link mechanism 30, described below, is provided. Also, the strap outlet part 20a is provided in the upper part of the central frame 22b.

The front leg frame 24 is used to constitute the front leg 14 that is covered by a cover material (not shown) and serves as second seat supporting elements, and is connected to the vehicle body floor 4 side to support the front side of the seat cushion frame 21. The front leg frame 24 is supported on the front side of the seat cushion frame 21 to be rotatable in the front and rear direction, and in the lower part of the front leg frame 24, locking claws 43, 43, that are connected to a leg striker 44 provided on the vehicle body floor 4 side to be engageable and disengageable, are provided at two places. In this embodiment, the configuration is made such that the locking claws 43 are provided at two places at the right and left. However, the configuration may be made such that either one of the right and left locking claws 43 is provided, or one locking claw 43 is provided at one place in the central portion.

Next, referring to FIGS. 5 to 9, the configuration of the link mechanism 30 is explained.

The link mechanism 30 is connected to the strap 20 operated at the time of stowage and restoration of the seat S, and has a function of appropriately releasing the rotating of the reclining mechanism 27 and the locked state of the front leg 14 to the vehicle body floor 4 in association with the operation of the strap 20 and the state of the seat S. As described above, the link mechanism 30 is formed on the back plate 28.

The link mechanism 30 is configured to have a first link member 31, a second link member 32, and a third link member 33, which are rotatably supported, and a power transmitting member is connected to each of the link members. These link members are configured to be operated in association with each other according to the state between the power transmitting members and the operation between the link members.

As the power transmitting members, there are provided a reclining releasing wire 40 connected to the reclining mechanism 27, the strap 20 serving as the operating element, a leg releasing wire 41 connected to the locking claw 43 of the front leg 14, and a cancel wire 42 for detecting the folded state of the seat back 12.

The first link member 31 is a substantially inverse triangular member that is flat in the right and left direction. To a locking part 34a, 40c provided on one end part side of the first link member 31, the reclining releasing wire 40 serving as the power transmitting member is locked, and to a locking part 34a provided on the other side of the first link member 31, the strap 20 is locked via a strap connecting member 34, so that the first link member 31 is rotatably supported on the back plate 28 by a first shaft part 31a provided between the locking parts 40c and 34a.

Also, between the first shaft part 31a and the locking part 34a, an arc-shaped elongated hole 31b is formed to draw a circle concentric with a second shaft part 33a, described below.

The other end part sides of the reclining releasing wire 40 locked to the first link member 31 as the power transmitting member and the strap 20 are explained below.

Figure 8:
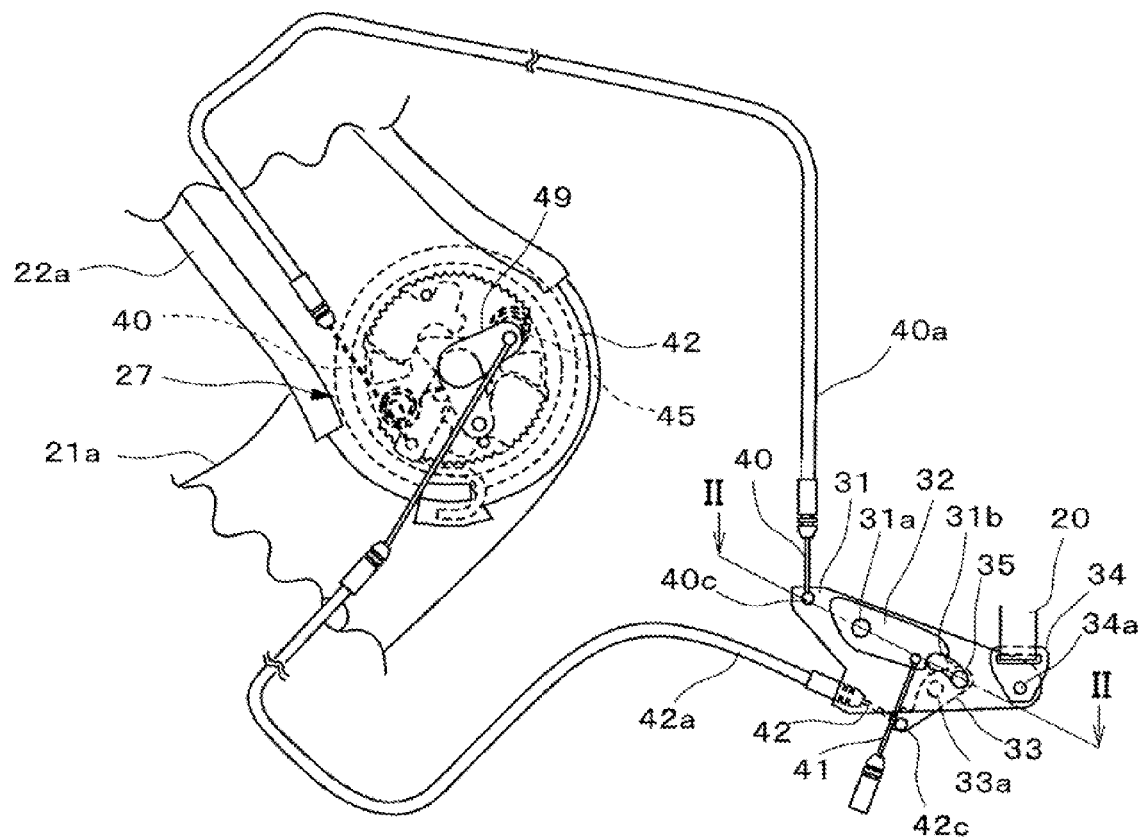
FIG. 8 is an enlarged explanatory side view of a link mechanism at the time of folding of a seat back in accordance with one embodiment of the present invention.
Figure 9:
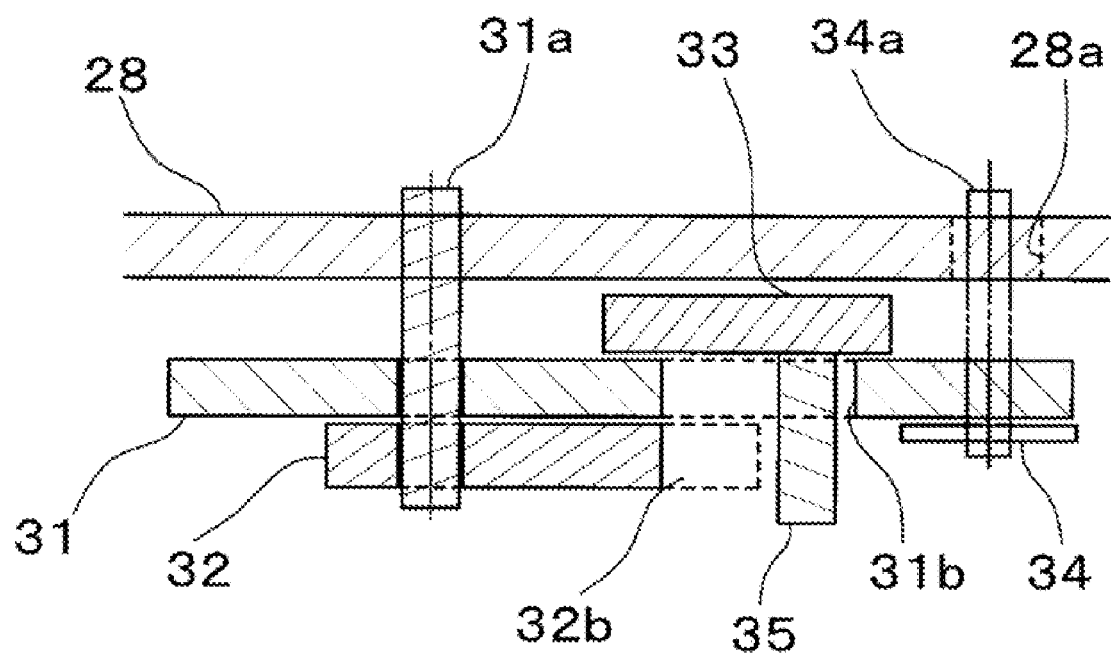
FIG. 9 is a sectional explanatory top view of a link mechanism in accordance with one embodiment of the present invention, the view being taken along the line II-II of FIG. 8.

As shown in FIG. 8, the other end part side of the reclining releasing wire 40 locked to the locking part 40c of the first link member 31 is guided by a reclining releasing cable 40a and is connected to the reclining mechanism 27 serving as the reclining element that releases the locked state of rotating of the seat back 12.

The reclining mechanism 27 is a mechanism for releasing the locked state of rotating of the reclining mechanism 27 to place the seat back 12 in a rotatable state when the reclining releasing wire 40 is pulled to the link mechanism 30 side by the operation of the link mechanism 30. The other end part side of the strap 20 connected to the first link member 31 via the strap connecting member 34 is extended from the strap outlet part 20a provided on the back surface of the seat back 12 to the outside of the seat back 12 to make the operation performed by the passenger easy. In association with the operation of the strap 20 performed by the passenger, the power (the operating force of the passenger) can be transmitted to the first link member 31.

That is to say, when the strap 20 is operated, the first link member 31 is rotated, and the locking of the reclining mechanism 27 is released.

The second link member 32 is a substantially rectangular member, and is disposed on the first link member 31.

The end part side on which the reclining releasing wire 40 is mounted is pivotally supported to be rotatable coaxially with the first link member 31 by the first shaft part 31a. On the other end part side, a locking recess 32b that is in contact with a locking protrusion 35, described below, is formed. Between the first shaft part 31a and the locking recess 32b, a locking part 41c to which the leg releasing wire 41 is locked is formed.

The other end part side of the leg releasing wire 41 locked to the second link member 32 as the power transmitting member is explained below.

The other end part side of the leg releasing wire 41 locked to the locking part 41c of the second link member 32 is guided by a leg releasing cable 41a and is connected to a leg locking releasing mechanism serving as a way to engage/disengage. The leg locking releasing mechanism is a mechanism that is formed in the front leg 14, and releases the locking to the leg striker 44 on the vehicle body floor 4 side by turning the locking claws 43 connected to the leg releasing wire 41 around a locking claw rotating shaft 43a when the leg releasing wire 41 is pulled to the link mechanism 30 side by the operation of the link mechanism 30. When the leg locking releasing mechanism is released, the seat cushion 11 becomes in a state of being rotatable in the front and rear direction.

The rotating of the locking claw 43 is urged by an urging spring 45 in the direction such that the locking state to the leg striker 44 is maintained.

The third link member 33 is a substantially rectangular member, being disposed between the first link member 31 and the back plate 28, and the central part thereof is rotatably supported on the first link member 31 side by the second shaft part 33a.

To the lower end part side of the third link member 33, the cancel wire 42 is locked via a locking part 42c.

On the upper end part side, the cylindrical locking protrusion 35 serving as a locking part is formed. This locking protrusion 35 is inserted through the arc-shaped elongated hole 31b formed in the first link member 31 and is in contact with the locking recess 32b of the second link member 32, so that the second link member 32 is locked to rotate together with the first link member 31. The locking protrusion 35 is formed to have an outside diameter slightly smaller than the width of the elongated hole 31b. On the other hand, the elongated hole 31b is formed in an arcuate shape to draw a circle concentric with the second shaft part 33a. Therefore, the configuration is made such that the locking protrusion 35 moves along the elongated hole 31b along with the rotating of the third link member 33.

The other end part side of the cancel wire 42 locked to the third link member 33 as the power transmitting member is explained below.

As shown in FIG. 8, the other end part side of the cancel wire 42 locked to the locking part 42c of the third link member 33 is guided by a cancel cable 42a and is connected to a locking rib 49 formed in the connecting part between the side frame 22a and the back frame support part 21a. The locking rib 49 is a member provided on the reclining mechanism 27, and is mounted to rotate together with the side frame 22a.

That is to say, in this embodiment, the other end part of the cancel wire 42 is locked to the locking rib 49. The other end part side of the cancel wire 42 is configured so that the locking rib 49 pulls the locking part 42c formed in the third link member 33 via the cancel wire 42 in the state in which the seat back 12 is folded, and functions as a detecting element by rotating the third link member 33. That is to say, the reclining assembly has the reclining mechanism 27 and the detecting element.

In this embodiment, the locking rib 49 locked to the other end part side of the cancel wire 42 is formed on the reclining mechanism 27. However, any other locking part may be used as far as the configuration is made such that the cancel wire 42 is operated in the state in which the seat back 12 is folded over the seat cushion 11. Further, the locking rib 49 may be formed in a portion separate from the reclining mechanism 27. In this case, the reclining assembly is configured so that the reclining mechanism 27 and the detecting element are provided in separate portions.

In the state in which the third link member 33 is not rotating, the second link member 32 is locked to the first link member 31 by the locking protrusion 35, and can pull the leg releasing wire 41 by rotating along with the rotating of the first link member 31.

When the third link member 33 is rotated, the locking protrusion 35 fixed to the third link member 33 moves along the elongated hole 31b. By the movement of the locking protrusion 35, the locking recess 32b is made to not be in contact with the locking protrusion 35. Therefore, the locking of rotating of the first link member 31 and the second link member 32 is released.

At this time, a state in which the second link member 32 does not rotate even if the first link member 31 is rotated by the operation of the strap 20 is formed, and the leg releasing wire 41 having been locked to second link member 32 becomes in a state of being not pulled even if the first link member 31 rotates.

That is to say, in the state in which the seat back 12 is folded, the configuration is such that even if the strap 20 is pulled, the locking of the front leg 14 to the vehicle body floor 4 is not released. In other words, by rotating of the third link member 33, a state in which the second link member 32 cannot rotate can be formed.

On the locking releasing mechanism side (the other end part side of the link mechanism 30) to which the reclining releasing wire 40 and the leg releasing wire 41 are connected, the urging spring 45 is provided to urge the reclining releasing wire 40 and the leg releasing wire 41 to the direction of holding in the locked state. Therefore, in the state in which the passenger does not operate the strap 20, concerning the first link member 31 and the second link member 32 as well, the rotating of the link mechanism 30 is urged to the direction such that the strap 20 is pulled downward via the strap connecting member 34.

In this embodiment, the locking part 34a of the strap connecting member 34 provided on the first link member 31 pivotally supports the strap connecting member 34 on the first link member 31 to be rotatable, and also the other end side thereof is inserted through a guide hole part 28a formed in the back plate 28. The guide hole part 28a is formed in an arcuate shape to draw a part of a circle concentric with the first shaft part 31a, so that the locking part 34a can move in the guide hole part 28a along with the rotating of the first link member 31. Also, by adjusting the length of the guide hole part 28a, the upper and lower limits of rotating amount of the first link member 31 can be set.

End part members 40b and 41b, which are end parts on the link mechanism 30 side of the reclining releasing cable 40a and the leg releasing cable 41a for guiding the reclining releasing wire 40 and the leg releasing wire 41, respectively, are fixed onto the back plate 28 by locking members (not shown).

An end part member 42b on the link mechanism 30 side of the cancel cable 42a for guiding the cancel wire 42 is fixed to the first link member 31 by a locking member (not shown).

The stowing/restoring operation of the seat S of this embodiment and the operation of the link mechanism 30 are explained below with reference to FIGS. 10 to 13.

First, the stowing operation of the seat S is explained with reference to FIGS. 10A to 10F.

Figure 10A:
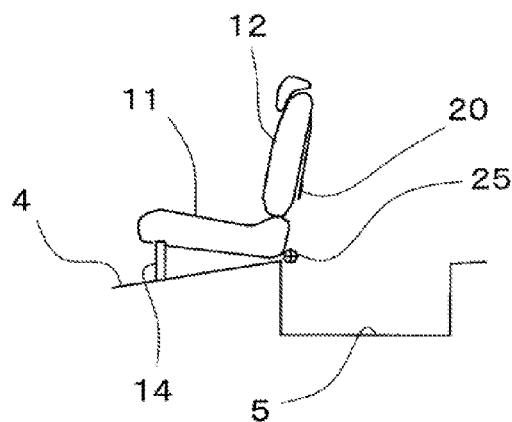
FIGS. 10A-F are explanatory side views showing an operation procedure at the time of stowing operation of a stowable vehicle seat in accordance with one embodiment of the present invention.

FIG. 10A shows the state in which the seat S is set. The strap 20 is extended from the back surface side of the seat back 12.

Figure 10B:
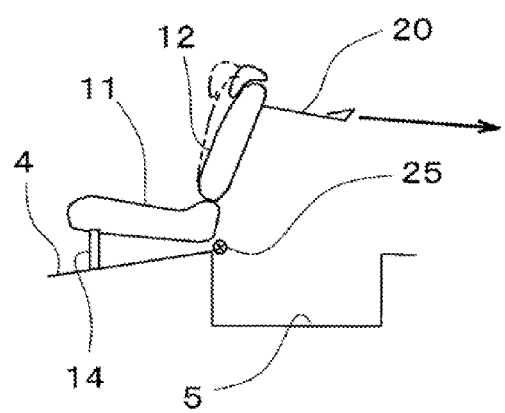

FIG. 10B shows the state in which the locking of the reclining mechanism 27 is released. When the passenger pulls the strap 20 to the rear, the locking of the reclining mechanism 27 is released.

At this time, the seat back 12 to which the strap 20 is mounted is being urged to the front direction by the urging spring (the spiral spring 48) mounted on the reclining mechanism 27. Since the configuration is made such that if the strap 20 is pulled against the urging direction, the locking of the locking claws 43 of the front leg 14 is released by a stress lower than the stress such as to fold the seat back 12 to the rear, the locking of the locking claws 43 is released.

Figure 10C:
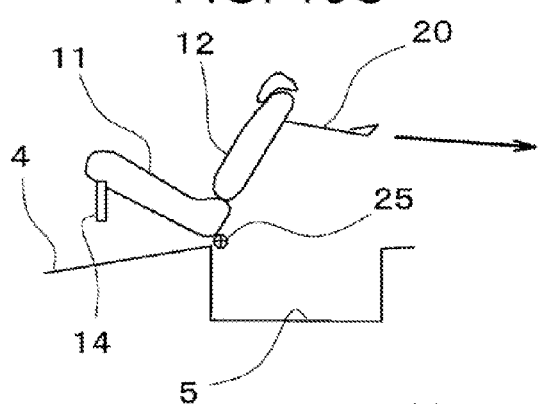

FIG. 10C shows the state in which the locking of the locking claws 43 of the front leg 14 has been released. The locking of the locking claws 43 of the front leg 14 is released, so that the seat S can be rotated to the rear.

Figure 10D:
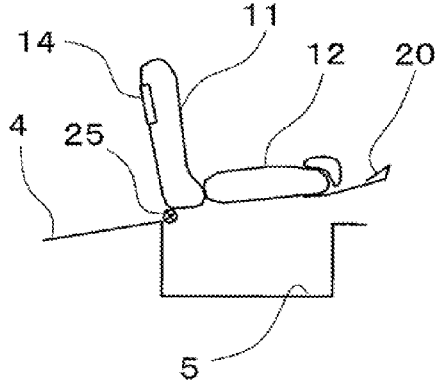
Figure 10E:
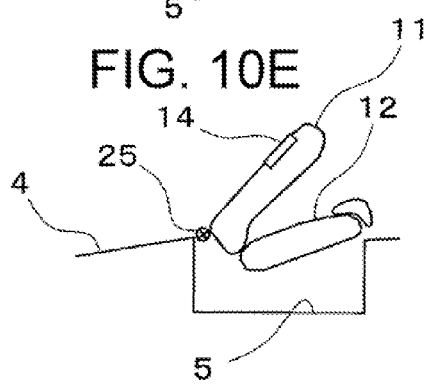

FIGS. 10D and 10E show the state in which the rearward rotating of the seat S is advanced. By pulling the strap 20 further, the seat S is rotated so that the center of gravity of the seat S goes beyond the middle point, and thereafter is rotated to the rear by its own weight, reaching a stowed state. At this time, the rearward rotating speed of the seat S is decreased by the urging spring (the spiral spring 48) mounted on the seat support part 25, so that the shock caused by the stowage into the stowage recess 5 is buffered. Also, the front leg 14 is folded to the seat cushion 11 side by its own weight. The seat back 12 is folded by the urging spring 45 mounted on the reclining mechanism 27, and is put on the seat cushion 11 in a folded manner.

Figure 10F:
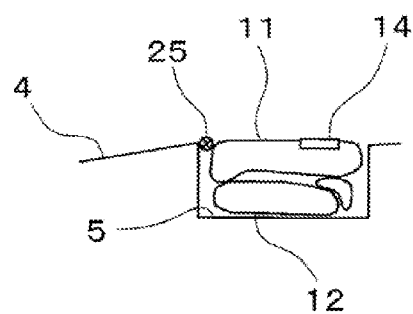

FIG. 10F shows the stowage state of the seat S. The opening part of the stowage recess 5 forms a flat surface integrally with the back surface of the seat cushion 11, so that a spacious cargo room is secured.

That is to say, merely by pulling the strap 20 to the rear by the passenger, the seat S in a set state can be stowed.

To keep the stowage state with more certainty, a locking mechanism for fixing the stowed seat S to the vehicle body floor 4 of the stowage recess 5 may be provided.

The operation of the link mechanism at the time of the above-described stowing operation of the seat S is explained with reference to FIGS. 11A, 11B and 11C.

FIG. 11A shows the state of the link mechanism 30 at the time when the seat S is set (refer to FIG. 10A). This state is a state before the strap 20 is operated by the passenger. This state of the link mechanism 30 is referred to as the original position.

FIG. 11B shows the state of the link mechanism 30 at the time when the locking of the reclining mechanism 27 is released (see FIG. 10B). This state is a state in which the strap 20 is pulled slightly to the rear. By the operation of the strap 20, the first link member 31 is rotated in the direction of being pulled by the strap 20. Therefore, the reclining releasing wire 40 is pulled along with the rotating, and the locking of the reclining mechanism 27 is released. At this time, the seat back 12 is in a state of being raised with respect to the seat cushion 11. Therefore, the cancel wire 42 is not pulled, and the second link member 32 rotates together with the first link member 31, whereby the leg releasing wire 41 is also pulled. However, a setting is made so that the locking of the locking claws 43 for connecting the front leg 14 to the vehicle body floor 4 side is not released by the pulling amount in this state, so that the locking of the leg is kept.

FIG. 11C shows the state of the link mechanism 30 at the time when the locking of the reclining mechanism 27 and the locking claws 43 of the front leg 14 has been released (FIGS. 10C and 10D), showing the state in which the strap 20 is further pulled. Compared with the state shown in FIG. 11B (see FIG. 10B), the first link member 31 is rotated greatly by strongly pulling the strap 20. Along with this rotating, the reclining releasing wire 40 and the leg releasing wire 41 are pulled further. At this time, the locking of the leg is released.

After the seat S has been stowed, when the pulling operation of the strap 20 is stopped, the state shown in FIG. 11A is restored by the urging spring 45 mounted on the locking releasing mechanism side (the other end part side of the link mechanism 30) to which the reclining releasing wire 40 and the leg releasing wire 41 are connected. However, since the seat back 12 is stowed in a state of being folded with respect to the seat cushion 11 (see FIGS. 10E and 10F), the cancel wire 42 is pulled, and the third link member 33 is still held in a state of being rotated.

Next, the restoring operation of the seat S is explained with reference to FIGS. 12A to 12E.

FIG. 12A shows the state in which the seat S has been stowed. When the seat S is pulled out of the stowage recess 5, the seat S is rotated to the front around the rotating shaft 25a.

FIG. 12B shows the state at the time when the seat S is rotated to the front. Along with the forward rotating of the seat S, the front leg 14 is deployed to the front by its own weight.

FIG. 12C shows the state in which the locking claws 43 of the front leg 14 of the seat S are locked to the vehicle body floor 4 side. The locking claw 43 is locked to the leg striker 44 on the vehicle body floor 4 side by pressing due to the own weight of the seat S. At this time, the seat back 12 is in a folded state.

FIG. 12D shows the operation for pulling the strap 20 to the rear from the state in which the locking claws 43 of the front leg 14 of the seat S are locked to the vehicle body floor 4 side. At this time, the locking claws 43 are kept in a locked state, so that only the seat back 12 can be raised with respect to the seat cushion 11.

FIG. 12E shows the state in which the restoring operation of the seat S has been finished.

After the seat S in the stowage state in which the seat back 12 is folded has been rotated to the front, the seat S can be restored merely by pulling the strap 20 to the rear by the passenger.

The operation of the link mechanism at the time of the above-described restoring operation of the seat S is explained with reference to FIGS. 13A, 13B and 13C.

FIG. 13A shows the state of the link mechanism 30 at the stage at which the seat S is rotated from the stowage state of the seat S (see FIG. 12A) and the locking claws 43 are locked to the vehicle body floor 4 side (see FIG. 12C). This stage is a stage before the strap 20 is operated by the passenger. Since the operation is performed in the state in which the seat back 12 is folded, the state in which the cancel wire 42 is pulled and the third link member 33 is rotated is held.

FIG. 13B shows the stage at which the strap 20 is pulled slightly to the rear to raise the seat back 12 (FIG. 12D). By the operation of the strap 20, the first link member 31 is rotated, and along with the rotating, the reclining releasing wire 40 is pulled. Thereby, the locking of the reclining mechanism 27 is released, and the seat back 12 can be rotated to the rear. At this time, since the locking protrusion 35 moves together with the third link member 33, even if the first link member 31 rotates, the second link member 32 is not locked and is in a state of being unable to rotate.

Along with the rise of the seat back 12, the rotating amount of the third link member 33 decreases. However, the third link member 33 rotates exceeding the rotate range in which the locking protrusion 35 comes into contact with the second link member 32, so that the locking recess 32b of the second link member 32 is kept in a state of not being locked to the first link member 31. Therefore, the state in which the locking of the locking claws 43 for connecting the front leg 14 to the vehicle body floor 4 side is not released is held, so that the seat back 12 can be raised with respect to the seat cushion 11 merely by pulling the strap 20.

FIG. 13C shows the state in which the restoring operation of the seat S has been finished (see FIG. 12E). When the rearward pulling operation of the strap 20 is stopped, the position of the first link member 31 is also returned to the original position by the urging from the reclining releasing wire 40 and the leg releasing wire 41. At this time, since the seat back 12 is raised with respect to the seat cushion 11, the third link member 33 is in a state of not being pulled by the cancel wire 42. Therefore, even by a minute stress, the rotating can be accomplished. The second link member 32 is also returned to the original position again and is locked to the first link member 31, and the link members of the link mechanism 30 is restored to the state of original position.

According to the stowable vehicle seat in accordance with embodiments of the present invention, the functions of the operating element having previously been divided into two functions conventionally are now integrated into the strap 20. Therefore, the operability at the time of stowage and restoration of seat is improved, and also the cost and weight can be reduced. That is to say, the state of seat can be changed from the set state to the stowage state only by the pulling operation of the strap 20, and further at the time of seat restoring operation as well, the seat back 12 can be raised with respect to the seat cushion 11 by pulling the strap 20, so that high operability can be assured. Also, since the operating element are integrated into the strap 20, the number of parts can be reduced, and therefore the cost and weight can be reduced.

Furthermore, the lever having been used as the conventional operating element is replaced with the pulling operation of the strap 20 via the link mechanism 30. Thereby, the lever operation performed by the movement of the hand fingers can be changed to the pulling operation of the strap 20 using the arm. Therefore, the operation stroke can be made long, and the operation load can be reduced.

In this embodiment, the third-row vehicle seat divided into the right and left has been explained as a specific example. However, the seat type is not limited to this type. Needless to say, the same configuration can be applied to a long bench type seat formed integrally, a passenger seat adjoining the driver's seat, and any other rear seat.

TABLE OF REFERENCE CHARACTERS

S seat
F seat frame
S1 right seat
S2 left seat
4 vehicle body floor
5 stowage recess
11 seat cushion
12 seat back
13 headrest
14 front leg
20 strap
20a strap outlet part
21 seat cushion frame
21a back frame support part
22 seat back frame
22a side frame
22b central frame
23 pillar support part
24 front leg frame
25 seat support part
25a rotating shaft
25b rotating shaft bracket
27 reclining mechanism
28 back plate
28a guide hole part
30 link mechanism
31 first link member
31a first shaft part
31b elongated hole
32 second link member
32b locking recess
33 third link mechanism
33a second shaft part
34 strap connecting member
34a, 40c, locking part
41c, 42c
35 locking protrusion
40 reclining releasing wire
40a reclining releasing cable
40b, 41b, end part member
42b
41 leg releasing wire
41a leg releasing cable
42 cancel wire
42a cancel cable
43 locking claw
43a locking claw rotating shaft
44 leg striker
45 urging spring
48 spiral spring
49 locking rib

The invention claimed is:

1. A stowable vehicle seat comprising:
first seat supporting elements for rotatably supporting an end part side of a seat cushion;
a seat back foldable over the seat cushion via a reclining assembly;
a stowage area provided on a vehicle body floor side;
second seat supporting elements provided on an other end part side of the seat cushion;
an engaging and disengaging assembly that engages and disengages the second seat supporting elements with and from the vehicle body floor side;
a link mechanism connected to the reclining assembly and the engaging and disengaging assembly; and
an operating element that operates the reclining assembly and the engaging and disengaging assembly via the link mechanisms;
wherein the reclining assembly comprises:
a reclining mechanism for making the seat back foldable over the seat cushion; and
a detecting element for detecting the folded state of the seat back, and the link mechanism comprises:
a first link member, which is supported rotatably, connected to the operating element and the reclining mechanism, and rotated by a pulling of the operating element;
a second link member which is supported rotatably, and connected to the engaging and disengaging assembly; and
a third link member, which is supported rotatably, and connected to the detecting element,
the third link member having a locking part for locking the second link member to the first link member to be engageable and disengageable, and rotating in a state in which the folding of the seat back is detected by the detecting element to enable the locking of the locking part to be released.

2. The stowable vehicle seat according to claim 1, wherein:
the second link member is rotatably supported to be coaxial with the first link member, and
the third link member is rotatably supported on the first link member.

3. The stowable vehicle seat according to claim 1, wherein the seat cushion is pivotally supported to be rotatable in the front and rear direction.

4. The stowable vehicle seat according to claim 1, wherein the operating element is a single element, and the single element is a strap.

* * * * *

UNITED STATES PATENT AND TRADEMARK OFFICE
CERTIFICATE OF CORRECTION

| | |
|---|---|
| PATENT NO. | : 8,052,194 B2 |
| APPLICATION NO. | : 12/682050 |
| DATED | : November 8, 2011 |
| INVENTOR(S) | : Tatsuo Sayama |

It is certified that error appears in the above-identified patent and that said Letters Patent is hereby corrected as shown below:

In Claim 1, Column 12, lines 33-34, replace "via the link mechanisms" with --via the link mechanism--

Signed and Sealed this
Sixth Day of March, 2012

David J. Kappos
*Director of the United States Patent and Trademark Office*